(12) United States Patent
Holzapfel

(10) Patent No.: US 7,268,883 B2
(45) Date of Patent: Sep. 11, 2007

(54) OPTOELECTRONIC HARMONICALLY FILTERED DETECTOR SYSTEM FOR A SCANNING UNIT

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 311 days.

(21) Appl. No.: 10/838,619

(22) Filed: May 3, 2004

(65) Prior Publication Data
US 2004/0218190 A1 Nov. 4, 2004

(30) Foreign Application Priority Data
May 2, 2003 (DE) ............... 103 19 609

(51) Int. Cl.
*G01B 9/02* (2006.01)
(52) U.S. Cl. ........................ 356/450; 356/499
(58) Field of Classification Search ................ 356/450, 356/498, 488, 494, 499; 250/231.13, 231.14
See application file for complete search history.

(56) References Cited

U.S. PATENT DOCUMENTS

| | | | |
|---|---|---|---|
| 4,782,229 A | 11/1988 | Ernst | |
| 5,646,730 A * | 7/1997 | Mitchell et al. | ............ 356/499 |
| 6,018,881 A | 2/2000 | Spies | |
| 6,392,224 B1 * | 5/2002 | Holzapfel et al. | ..... 250/231.13 |
| 2001/0017349 A1 * | 8/2001 | Holzapfel et al. | ..... 250/231.13 |
| 2003/0047673 A1 * | 3/2003 | Thorburn et al. | ...... 250/231.13 |

FOREIGN PATENT DOCUMENTS

| | | |
|---|---|---|
| DE | WO99/08074 | * 2/1999 |
| DE | 198 30 294 | 1/2000 |
| EP | 0 250 711 | 1/1988 |
| EP | 0 541 829 | 5/1993 |
| EP | 0 849 566 | 6/1998 |

* cited by examiner

*Primary Examiner*—Samuel A. Turner
(74) *Attorney, Agent, or Firm*—Kenyon & Kenyon LLP

(57) ABSTRACT

An optoelectronic detector system is for generating a plurality of periodic, phase-shifted scanning signals from the scanning of a periodic fringe pattern. The fringe pattern extends in a detection plane with fringe-pattern period P in a fringe-displacement direction. The detector system is made up of a plurality of detector elements, the geometrical shape of the detector elements being selected such that a defined filtering of unwanted harmonics from the scanning signals thereby results. Within one fringe-pattern period P, a total of N detector elements of the same geometrical shape are arranged one immediately after the other in measuring direction x.

16 Claims, 5 Drawing Sheets

OPTOELECTRONIC HARMONICALLY FILTERED DETECTOR SYSTEM FOR A SCANNING UNIT

CROSS-REFERENCE TO RELATED APPLICATIONS

The present application claims priority to Application No. 103 19 609.9, filed in the Federal Republic of Germany on May 2, 2003, which is expressly incorporated herein in its entirety by reference thereto.

FIELD OF THE INVENTION

The present invention relates to an optoelectronic detector system, which may be used, e.g., in the scanning unit of an optical position-measuring device for scanning a periodic fringe pattern and for generating displacement-dependent scanning signals.

BACKGROUND INFORMATION

A detector system of this type is described, for example, in European Published Patent Application No. 0 250 711, which is used in the scanning unit of an optical position-measuring device to scan a periodic fringe pattern, which results in a detection plane there. The fringe pattern is produced in a conventional manner on the basis of the interaction of the light bundle, emitted by a light source in the scanning unit, with a measuring graduation and, if applicable, one or more further graduations in the scanning beam path. If the scanning unit and the measuring graduation move relative to each other, the fringe pattern is shifted perpendicular to the fringes and therefore is periodically intensity-modulated at each position. From the optoelectronic scanning of the fringe pattern, displacement-dependent, sinusoidal scanning signals may be generated in a conventional manner in the form of periodic incremental signals. As a rule, two or more incremental signals are phase-shifted in a defined manner and are then further processed in sequential electronics are generated in this manner.

Because of the wide variety of interference effects, as a rule the scanning signals generated in this manner are not ideally sinusoidal, but rather, because of harmonic components, have a signal shape deviating therefrom. However, for error-free further processing of the scanning signals in sequential electronics, signals which, to the greatest extent possible, are free of harmonics are desirable. For this reason, European Published Patent Application No. 0 250 711 proposes carrying out a defined harmonic filtering by a suitable arrangement and dimensioning of the individual detector elements in the detector system provided. To that end, widely varying geometrical shapes of the individual detector elements are proposed in various exemplary embodiments. Disadvantageous in the various design approaches, however, is that, first of all, the available detector-element surface area is not fully utilized, thus certain regions of the detector-element surface area remain unused. However, for a high signal intensity, the best possible utilization of the available detector-element surface area is desirable. Secondly, the proposed geometries of the detector elements are sensitive to possible interferences in the scanned fringe pattern, which in turn can lead to signal errors. Such interferences in the fringe pattern may be caused, for instance, by tilting and/or rotating the scanning unit with respect to the measuring graduation, or else by an uneven surface of the measuring graduation. The result in these cases are deformed and/or stretched fringe patterns which are scanned.

It is an aspect of the present invention to provide an optoelectronic detector system for a scanning unit of an optical position-measuring device that may ensure both reliable harmonic filtering in the resulting scanning signals, as well as an efficient utilization of the available detector surface possible.

SUMMARY

This above and other beneficial aspects of the present invention may be achieved by providing an optoelectronic detector system having the features as described herein.

Example embodiments of the optoelectronic detector system according to the present invention are described herein.

The subject matter hereof also relates to a position-measuring device, in the scanning unit of which such a detector system is provided.

According to an example embodiment of the present invention, the harmonics-filtering, geometrical shape or contour of the individual detector elements is provided so as to permit a direct successive arrangement of the individual detector elements in the fringe-displacement direction of the periodic fringe pattern to be scanned. In this context, the geometrical shape is selected to be non-rectangular. This may result in the densest possible arrangement of the individual detector elements within the system, i.e., optimum utilization of the available detector-element surface area. This may result in a high signal intensity of the generated scanning signals.

The arrangement according to an example embodiment of the present invention of the individual detector elements, which are convertible one into another solely by displacement transformations in the fringe-displacement direction by multiples of P/N (where P=fringe-pattern period; N=number of detector elements per fringe-pattern period), may ensure that the individual detector elements in each case have the same centroid relative to the direction perpendicular to the fringe-displacement direction. The result is that possible interferences in the scanned fringe pattern may influence all detector elements uniformly, and errors during further processing may be minimized. As mentioned above, such errors result, for instance, from tilting and/or rotation of the scanning unit with respect to the measuring graduation. In particular, a tilt of the scanning unit about an axis perpendicular to the measuring-graduation surface (so-called Moiré tilt) shifts the phase positions of the phase-shifted scanning signals relative to each other, resulting in considerable interpolation errors during further processing.

Three or four detector elements shaped according to the principles described herein may be positioned within one scanned fringe-pattern period P, to thus generate either three incremental signals phase-shifted by 120° each, or four incremental signals phase-shifted by 90° each.

A plurality of such detector elements extend over the entire detector system, in each case those detector elements which generate in-phase scanning signals from the fringe-pattern scanning being conductively connected to one another. Interconnected detector elements may have a spacing which corresponds to one fringe-pattern period. The system therefore may ensure reliable scanning of the fringe pattern even when, for example, the measuring graduation is partially soiled.

In an example embodiment of the present invention, the odd-order harmonic components are selectively removed from the scanning signals by the suitable geometrical shape of the detector elements. The even-order harmonic components may be removed differently in a conventional manner, for instance, by the so-called push-pull interconnection of scanning signals phase-displaced by 180°.

As an alternative to the direct forming of the individual detector elements, provision may also be made to arrange opaque resist masks, which have suitable contours for the harmonics filtering, on at least parts of the individual detector elements.

Therefore, on the basis of the foregoing and following description, it may be possible to construct particularly simple position-measuring devices which include essentially only one light source, one measuring graduation and one detector system. That is to say, e.g., no further scanning graduation may be necessary any longer as in conventional systems.

The foregoing and following measures may be utilized in conjunction both with rotary and with linear position-measuring devices.

According to an example embodiment of the present invention, an optoelectronic detector system for generating a plurality of periodic, phase-shifted scanning signals from scanning of a periodic fringe pattern that extends in a detection plane with a fringe-pattern period in a fringe-displacement direction includes a plurality of detector elements. A geometrical form of individual detector elements is adapted to provide a defined filter of unwanted harmonics from the scanning signal. In one fringe-pattern period, a total number of detector elements of a same non-rectangular geometrical form are arranged one immediately after another in the fringe-displacement direction.

The detector elements may be arranged successively and convertibly one into another by a displacement transformation by multiples of the fringe-pattern period divided by the total number of detector elements within one fringe-pattern period.

Adjacent detector elements may contact each other along a shared contact line.

The contact lines may form an angle with the fringe-displacement direction unequal to 90°.

The detector elements may have curved boundary lines in a region of longitudinal ends.

Each detector element may have a geometrical shape that deviates from a rectangle to filter at least one odd-order harmonic out of the scanning signals.

Each detector element may have a same width along a line of intersection parallel to the fringe-displacement direction.

The width of each detector element along the line of intersection may satisfy the relationship $b = P/N - e$. In the foregoing relationship b represents the width of one detector element along the line of intersection, p represents the fringe-pattern period, N represents the number of detector elements per fringe-pattern period, and e represents a technology-dependent minimum distance of active detector-element areas.

The total number of detector elements within one fringe-pattern period may be 3 or 4.

The detector elements may be configured to generate in-phase scanning signals from scanning of the fringe pattern and may be electroconductively interconnected.

In an example embodiment of the present invention, an optoelectronic detector system for generating a plurality of periodic, phase-shifted scanning signals from scanning of a periodic fringe pattern that extends in a detection plane with a fringe-pattern period in a fringe-displacement direction includes a plurality of detector systems adjacently arranged in parallel, perpendicular to the fringe-displacement direction. Each detector system includes a plurality of detector elements, a geometrical form of individual detector elements adapted to provide a defined filter of unwanted harmonics from the scanning signal. In one fringe-pattern period, a total number of detector elements in each detector system of a same non-rectangular geometrical form are arranged one immediately after another in the fringe-displacement direction.

In an example embodiment of the present invention, a position-measuring device for determining a position of two objects movable relative to each other includes a measuring graduation extending in a measuring direction and a scanning unit movable relative to the measuring graduation. The scanning unit includes a light source and an optoelectronic detector system configured to generate a plurality of periodic, phase-shifted scanning signals from scanning of a periodic fringe pattern that extends in a detection plane with a fringe-pattern period in a fringe-displacement direction. The optoelectronic detector system includes a plurality of detector elements, a geometrical form of individual detector elements adapted to provide a defined filter of unwanted harmonics from the scanning signal, in one fringe-pattern period, a total number of detector elements of a same non-rectangular geometrical form arranged one immediately after another in the fringe-displacement direction.

The measuring direction may extend along a straight line.

The measuring direction may extend along a circular path.

Other aspects and details pertaining thereto are derived from the following description of exemplary embodiments, on the basis of the appended Figures.

DETAILED DESCRIPTION

Figure 1:
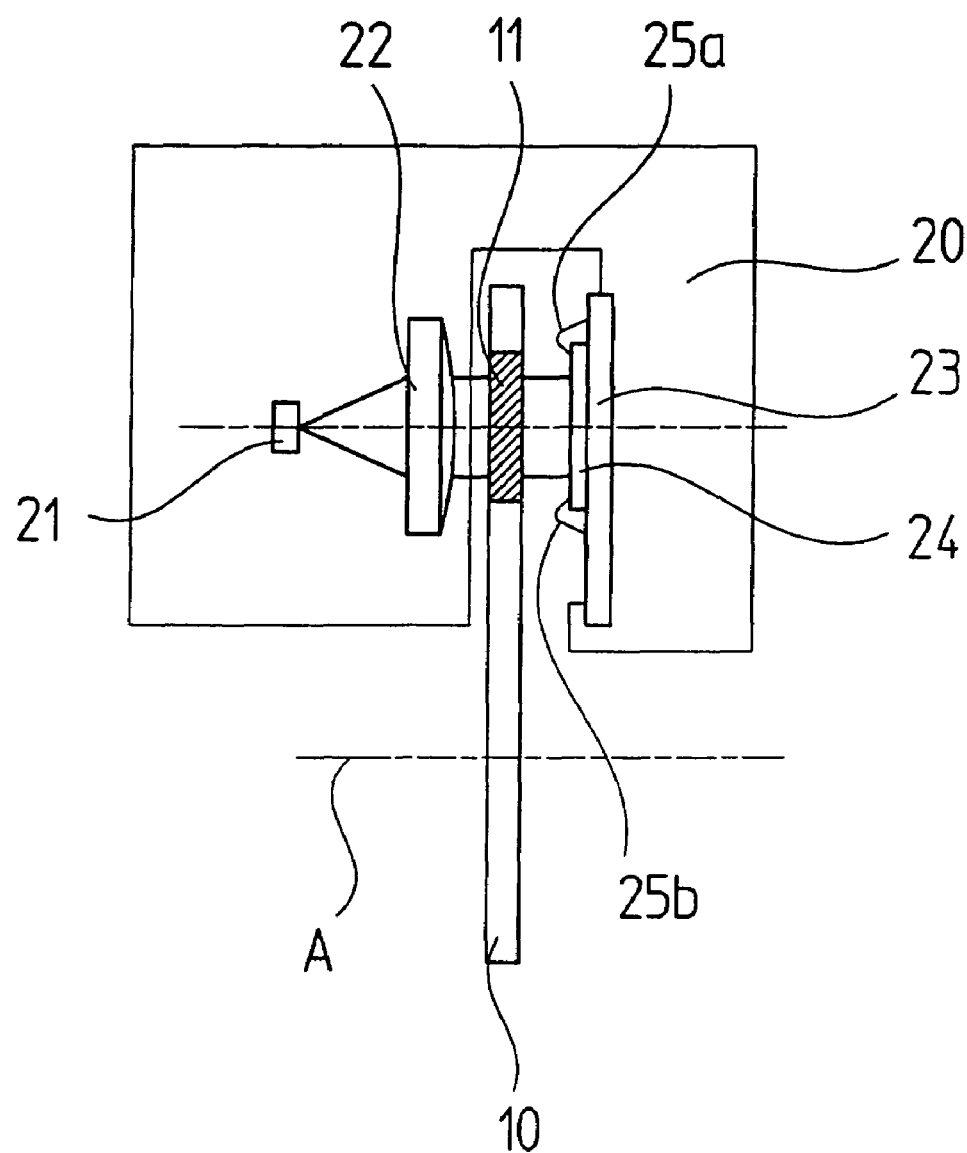
FIG. 1 is a schematic view of a rotary position-measuring device in which an optoelectronic detector system according to an example embodiment of the present invention is used.

FIG. 1 is a schematic side view of a position-measuring device in which an optoelectronic detector system 24, constructed according to an example embodiment of the present invention, is used. In the case of the exemplary embodiment shown, it is a rotary position-measuring device by which the position, i.e., the specific angle of rotation of a graduated disk 10 rotating about axis A, is to be determined. In this example, graduated disk 10 has a measuring graduation 11, arranged in the shape of a circular ring, which is scanned in transmitted light and may be formed in a conventional manner as a periodic sequence of transparent and opaque partial areas. The periodicity of measuring graduation 11, i.e., the width of an adjacent pair of transparent and opaque partial areas, is designated as measuring-graduation period TPM.

To generate position-dependent scanning signals, the position-measuring device shown also includes a scanning unit 20 having a light source 21, a collimating optics 22 placed before the light source, as well as a scanning board 23 on which optoelectronic detector system 24 of an example embodiment of the present invention is arranged in the detection plane. Detector system 24 is connected to electroconductive printed conductors on scanning board 23 by bonding wires 25a, 25b. In the event of the relative movement of graduated disk 10 and scanning unit 20, a periodic fringe pattern resulting in the detection plane is scanned using optoelectronic detector system 24 described in more detail below, the fringe pattern being modulated in dependence on the displacement, that is, converted to periodic, electrical scanning signals, i.e., incremental signals.

Moreover, scanning board 23 may include additional electronic components to further process the generated scanning signals.

The scanning signals generated by the position-measuring device and possibly already conditioned are fed via signal transmission lines to sequential electronics which, for example, assume certain control and/or regulating tasks.

In the exemplary embodiment illustrated in FIG. 1, a rotary position-measuring device is shown in which measuring direction x, thus the relative displacement direction of measuring graduation 11 and scanning unit 20, extends along a circular path, and the position-dependent scanning signals are generated via a transmitted-light scanning. The measures hereof may also be put into effect in conjunction with linear position-measuring devices, in which measuring direction x extends in the linear direction, i.e., along a straight line. The same holds true for alternative scanning principles such as incident-light scanning and/or alternative optical scanning-beam paths with, if desired, further scanning gratings, etc.

Figure 2:
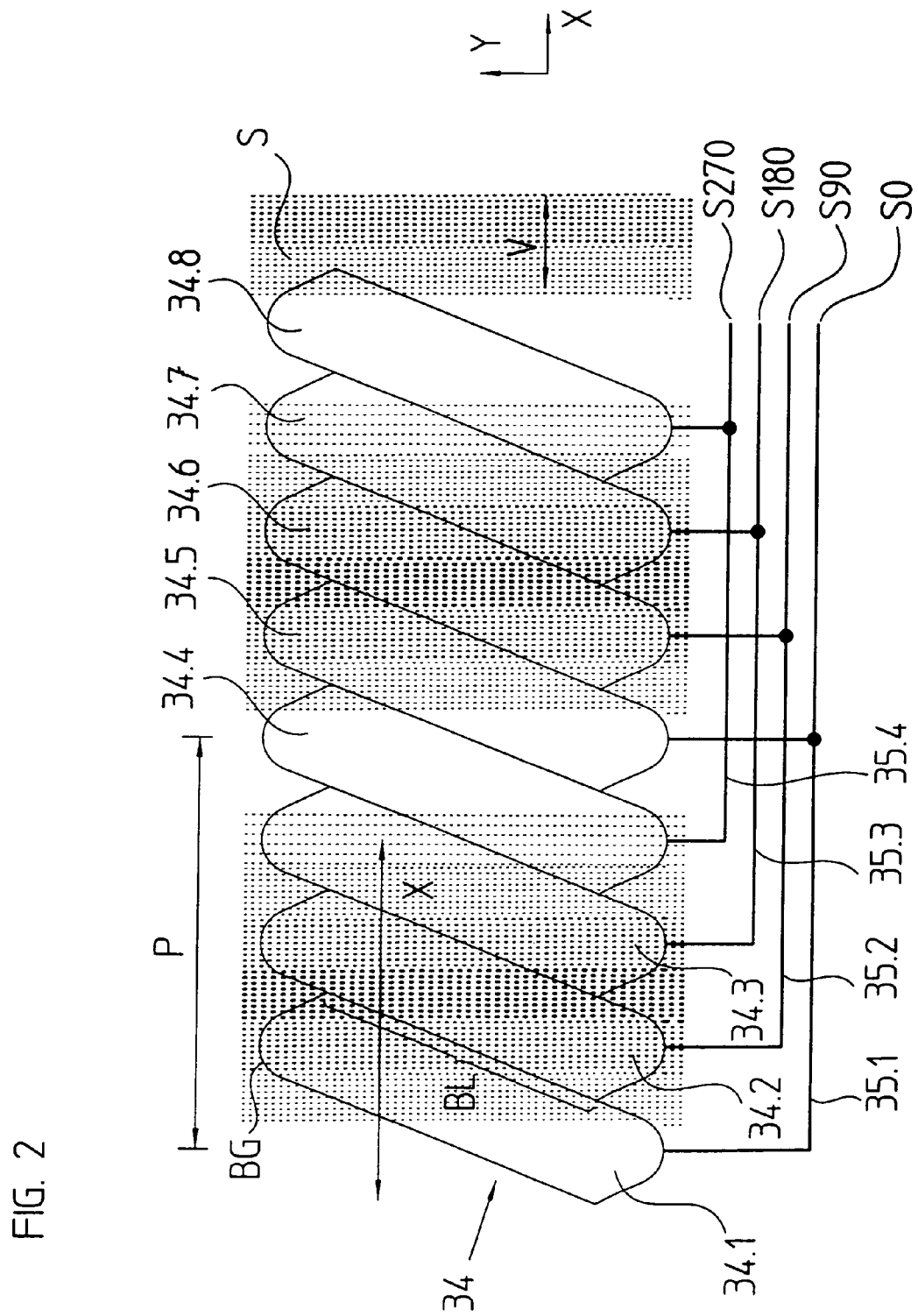
FIG. 2 is a plan view of an exemplary embodiment of an optoelectronic detector system according to the present invention in conjunction with the periodic fringe pattern which it scans.

A partial plan view of an exemplary embodiment of an optoelectronic detector system 34 according to the present invention is illustrated schematically in FIG. 2 in conjunction with the periodic fringe pattern resulting in the detection plane. For clarity, the linear case is illustrated in which a periodic fringe pattern S extending in fringe-displacement direction v, i.e., measuring direction x, and having fringe-pattern period P is scanned by a detector system 34 extending in linear fashion in direction x. In the event of the relative movement of the measuring graduation and the scanning unit, fringe pattern S illustrated shifts in a direction designated in the following as fringe-displacement direction v across detector system 34 and in this manner brings about the generation of a plurality of phase-shifted scanning signals S0, S90, S180, S270. In the present example, fringe-displacement direction v already mentioned above is identical to measuring direction x. In principle, however, it is not essential that both directions coincide. For example, in the case of a so-called Moiré scanning, a fringe pattern oriented at an angle with respect to the detector system results in the detection plane, i.e., directions x and v then assume an angle relative to each other not equal to 0°.

In the present exemplary embodiment, detector system 34 includes a plurality of individual radiation-sensitive detector elements 34.1 to 34.8, of which only a portion is illustrated in FIG. 2. In practice, detector system 34 may have up to 1000 individual detector elements 34.1 to 34.8.

As FIG. 2 illustrates, in each case those individual detector elements 34.1 to 34.8 which deliver in-phase scanning signals S0, S90, S180, S270 during the scanning of fringe pattern S are electroconductively interconnected via corresponding contact lines 35.1 to 35.4. The distance of interconnected detector elements 34.1 to 34.8 in the present example is one fringe-pattern period P. In the example, each fourth detector element is interconnected via corresponding contact lines 35.1 to 35.4, thus, detector element 34.1 is connected to detector element 34.5 via contact line 35.1, etc. The scanning signal resulting via interconnected detector elements 34.1, 34.5, etc. is designated in the following as scanning signal S0. The further three scanning signals S90, S180 and S270 result in a manner analogous thereto. In this context, the successive periodic scanning signals each have a phase displacement of 90° relative to each other.

In the present case, therefore, within one scanned fringe-pattern period P, N=4 detector elements 34.1 to 34.8 are arranged one immediately after the other in fringe-displacement direction v, so that resulting on the output side are the mentioned N=4 periodic scanning signals S0, S90, S180 und S270, phase-shifted in each case by 90°, which are able to be further processed in a convention manner.

As illustrated in FIG. 2, the geometry or contour of individual detector elements 34.1 to 34.8 deviates from a rectangle and, according to an example embodiment of the present invention, is selected such that the suitable geometrical shape results in a defined filtering of unwanted harmonics from the scanning signals. In the case of the detector-element geometry illustrated in FIG. 2, for instance, it is possible to filter odd-order harmonics. Reference is made to the description of the following examples regarding specific shaping principles for the required elimination of certain harmonics.

The various detector elements 34.1 to 34.8 may all have the same geometrical shape. This means that detector elements 34.1 to 34.8 are each able to be converted to one another by simple mathematical displacement transformations in the system direction or fringe-displacement direction v. In this connection, a corresponding displacement transformation in fringe-displacement direction v by displacement amount d=P/N is necessary in each case to thus convert one detector element 34.1 to 34.8 to another detector element 34.1 to 34.8.

FIG. 2 also illustrates that adjacent detector elements 34.1 to 34.8 contact each other along a common, approximately linear contact line BL. In the case of the two detector elements 34.1 and 34.2, the corresponding contact line is indicated by reference character BL. As is illustrated, contact line BL may assume an angle α with fringe-displacement direction v that is not equal to 90°.

Apart from approximately linear contact line BL, individual detector elements 34.1 to 34.8 in the present exemplary embodiment may have essentially curved boundary lines BG at the respective longitudinal ends. Reference is made to the following description regarding dimensioning details with respect to the shaping of individual detector elements 34.1 to 34.8.

Because of the transformation properties explained above, individual detector elements 34.1 to 34.8 of detector system 34 according to an example embodiment of the present invention each have the same width b along a line of intersection parallel to fringe-displacement direction v. In the case of the linear detector system shown, width b over the y-extension of contact line BL is the same for all detector elements 34.1 to 34.8 and has the value b=P/N.

Figure 3:
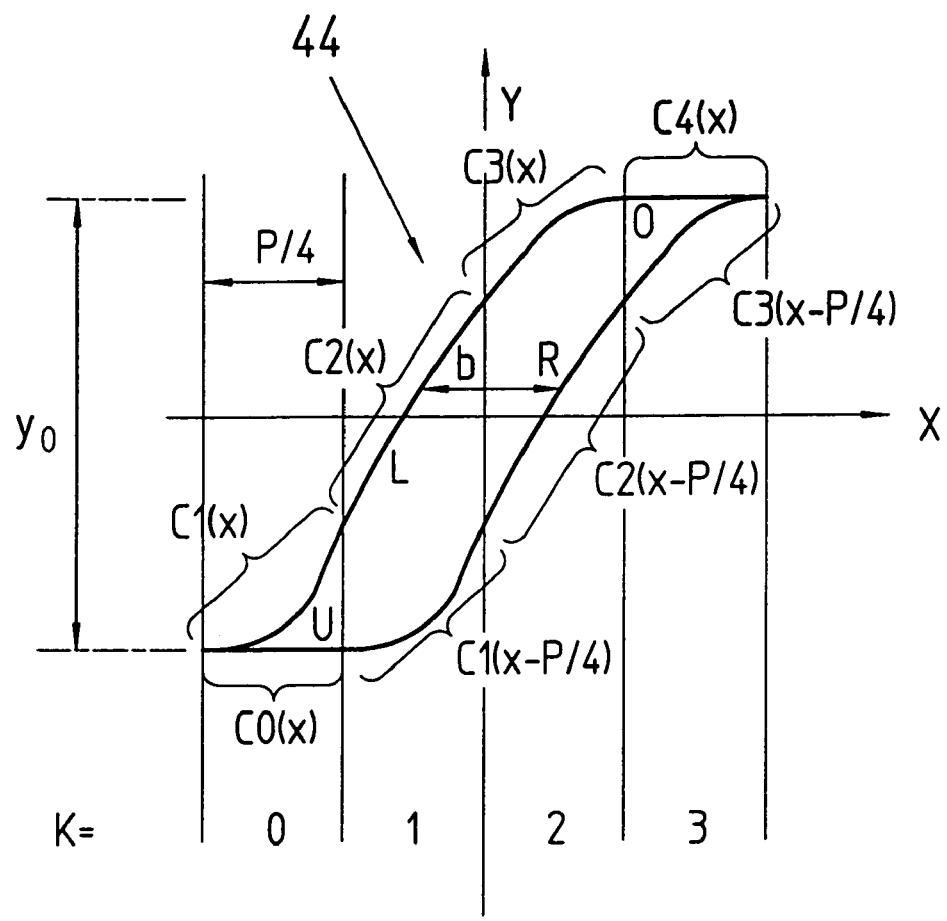
FIG. 3 is a schematic partial view of an exemplary embodiment for a single detector element that is usable in a detector system of the present invention for a linear position-measuring device, and with the aid of which the basic considerations with respect to the geometry of the individual detector elements are clarified.
Figure 4:
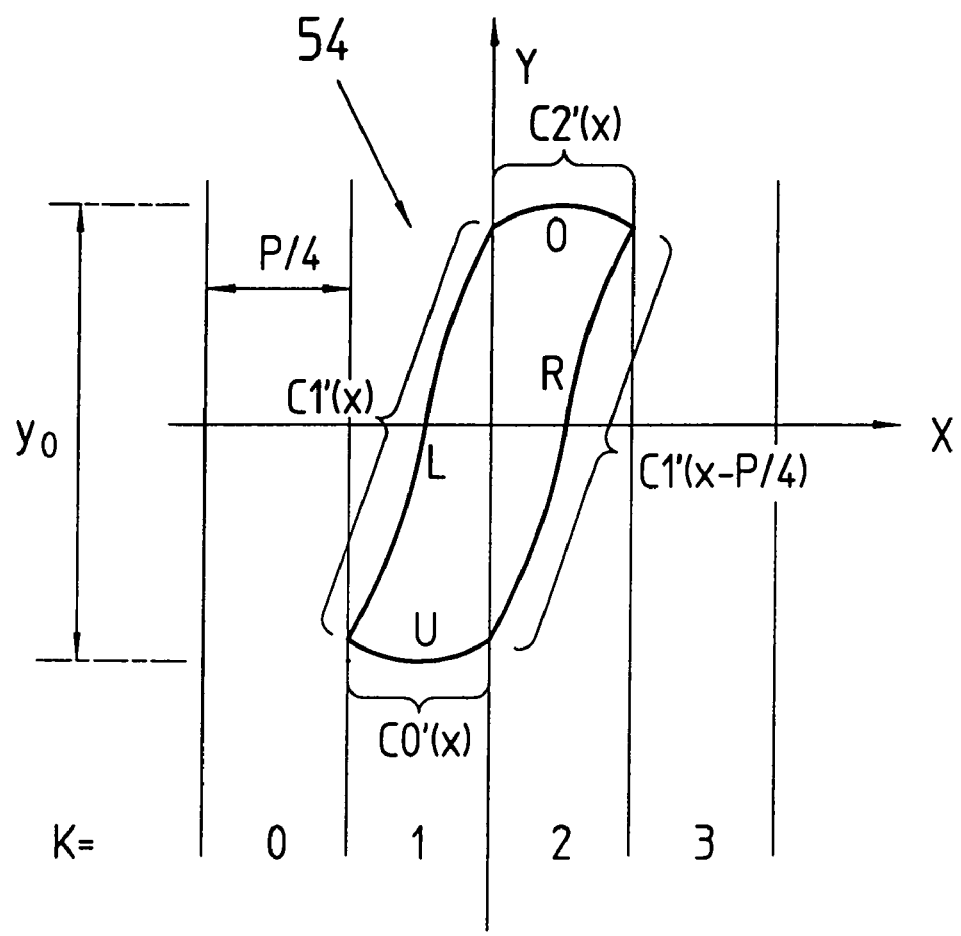
FIG. 4 is a schematic partial view of an exemplary embodiment for a single detector element usable in a detector system of the present invention for a linear position-measuring device.
Figure 5:
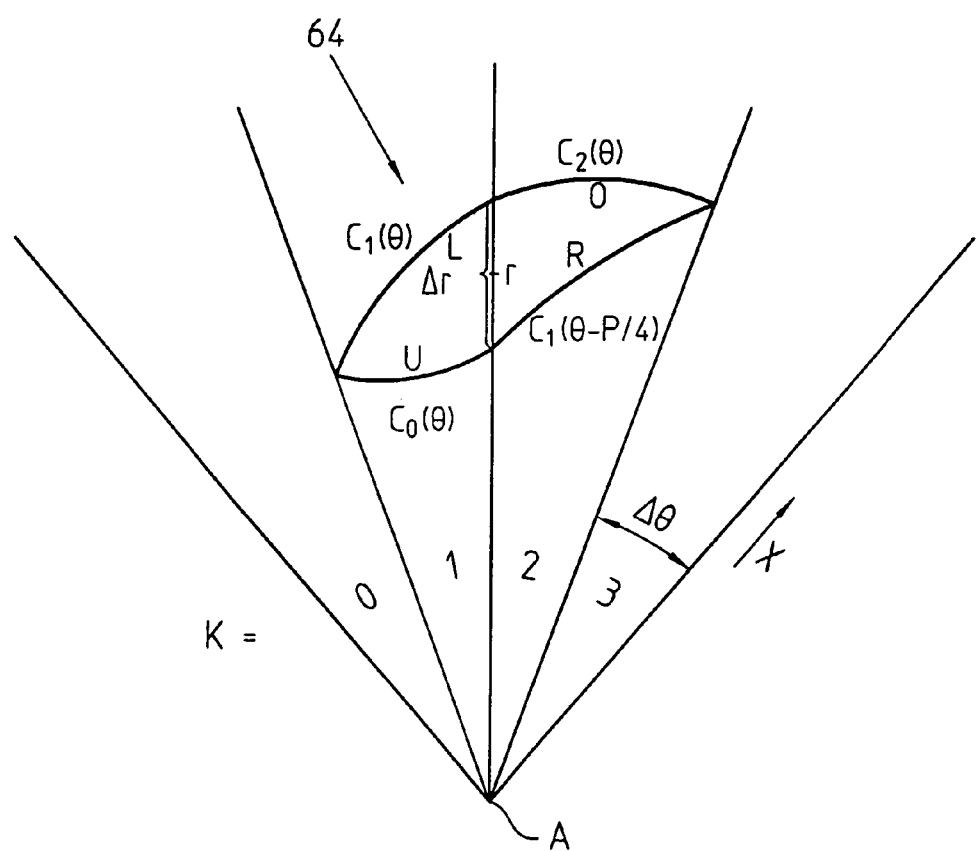
FIG. 5 is a schematic partial view of an exemplary embodiment for a single detector element suitable for use in a detector system of the present invention for a rotary position-measuring device.

With reference to FIGS. 3 to 5, it is clarified in the following how an individual detector element within the detector system of an example embodiment of the present invention is shaped as a function of certain desired filter properties. Basically, in these examples, it is assumed that in each case four scanning signals are generated phase-displaced by 90°.

FIG. 3 illustrates an example of a single detector element 44 which, in principle, may be suitable for filtering all harmonics of the resulting scanning signal. The complete detector system has a plurality of such detector elements arranged one immediately after the other in measuring direction x. In the present example embodiment, measuring direction x and fringe-displacement direction v again coincide. The detector element illustrated is used in a detector system of a linear position-measuring device.

Individual detector element 44 extends in measuring direction x over a total of four quadrants K0 to K3 of equal width, the width of one quadrant K0 to K3 in each case being selected to be equal to P/4, and P indicating the fringe-pattern period scanned. Detector element 44 illustrated in FIG. 3 is bounded by a left curve path L, a right curve path R, an upper curve path O and a lower curve path U. Individual curve paths L, R, O and U may, as illustrated, be described by curve elements $y=C_n(x)$, n=0, 1, ... 4, which in each case are defined in one quadrant K0 to K3 having width P/4. Curve elements $C_1(x)$, $C_2(x)$, $C_3(X)$ of left curve path L in quadrants K0, K1, K2 agree with those curve elements $C_1(x-P/4)$, $C_2(x-P/4)$ und $C_3(x-P/4)$ in quadrants K1, K2 and K3 adjacent to the right in each case. In the present example embodiment, this dimensioning rule may ensure a constant width b of detector element 44 over the entire y-extension. At the same time, it may ensure that the individual detector elements of the detector system may be arranged seamlessly side-by-side at a distance P/4, in order to supply the desired phase shift of 90° between the generated scanning signals of adjacent detector elements.

To attain the desired filtering action, at each position x the height of detector element 44 in the y-direction may correspond to a desired filter function F(x). For a complete filtering of all harmonics according to the present exemplary embodiment, the corresponding filter function reads:

$$F(x)=F_0*(1+\cos(2\pi x/P)) \tag{Equ. 1}$$

where $F_0$ represents a freely selectable constant indicating the desired maximum y-extension of the detector elements. The observance of this condition and therefore the filtering of all harmonics may be ensured if individual curve elements $C_n(x)$ satisfy the following conditions:

$$C_1(x)=C_0(x)+F(x) \text{ (condition in quadrant } K0\text{)} \tag{Equ. 2.1}$$

$$C_2(x)=C_1(x-P/4)+F(x) \text{ (condition in quadrant } K1\text{)} \tag{Equ. 2.2}$$

$$C_3(x)=C_2(x-P/4)+F(x) \text{ (condition in quadrant } K2\text{)} \tag{Equ. 2.3}$$

$$C_4(x)=C_3(x-P/4)+F(x) \text{ (condition in quadrant } K3\text{)} \tag{Equ. 2.4}$$

In the example shown, assuming a straight curve path U given a detector length $y_0$, the result for the individual curve elements is:

$$C_0(x)=-y_0/2 \text{ (for } -P/2<x<-P/4\text{)} \tag{Equ. 3.1}$$

$$C_1(x)=y_0/2*[-1/2+1/2*\cos(2\pi x/P)] \tag{Equ. 3.2}$$

$$C_2(x)=y_0/2*[1/2*\sin(2\pi x/P)+1/2*\cos(2\pi x/P)] \tag{Equ. 3.3}$$

$$C_3(x)=y_0/2*[1/2*\sin(2\pi x/P)] \tag{Equ. 3.4}$$

$$C_4(x)=y_0/2 \tag{Equ. 3.5}$$

In the present example embodiment, the constant $F_0=y_0/2$ is selected, so that resulting detector element 35 is centered with respect to y=0. Since, therefore, all the detector elements have their geometric center of mass at y=0, and in each case have the identical geometrical shape, the scanning signals resulting therefrom are all equally influenced by possible interferences which act differently in the y-direction. Examples of such interferences would be, for instance, so-called Moiré rotations of the scanning unit, soiling of the measuring graduation, inhomogeneous irradiance of the illumination, etc.

As an alternative to the filtering of all harmonics described above, provision may also be made to filter only certain harmonics. This is explained below with reference to the exemplary embodiment of a suitable detector element illustrated in FIG. 4. FIG. 4 illustrates only a single detector element 54 as used in a detector system of an example embodiment of the present invention for a position-measuring device which is linear.

In this example embodiment, only the filtering of all odd-order harmonics is now provided, i.e., all even-order harmonics are eliminated in a conventional manner by other measures. Among these are, for instance, the utilization of certain optical conditions, or else the so-called push-pull interconnection of scanning signals, etc.

The necessary filter function F(x) for the filtering of odd-order harmonics reads:

$$F(x)=\begin{cases} F_0*\cos(2\pi x/P) & \text{for } -P/4<x<P/4 \\ 0 & \text{otherwise,} \end{cases} \tag{Equ. 4}$$

where $F_0$ represents a freely selectable constant indicating the desired y-extension of the detector elements.

The result of the filter condition in equation 4 is that relevant detector element 54—as illustrated in FIG. 4—extends only in the two middle quadrants K1 and K2.

The curve elements necessary for the geometrical description of the detector-element contour may then be indicated by the following functions:

$$C_1'(x)=C_0'(x)+F_0*\cos(2\pi x/P) \tag{Equ. 5.1}$$

$$C_2'(x)=C_0'(x-P/4)+F_0*\sin(2\pi x/P)+F_0*\cos(2\pi x/P) \tag{Equ. 5.2}$$

Basically, $C_0'(x)$ in this context may be selected as desired. In the selection of a function $C_0'(x)$ which, in quadrant K1, is approximately mirror-symmetrical to the center line of the quadrant (parallel to the y-axis), the following results:

$$C_0'(x)=(-y_0/\sqrt{2})*\cos(2\pi x/P+\pi/4) \tag{Equ. 6.1}$$

$$C_1'(x)=(y_0/\sqrt{2})*\sin(2\pi x/P+\pi/4) \tag{Equ. 6.2}$$

$$C_2'(x)=(y_0/\sqrt{2})*\cos(2\pi x/P-\pi/4) \tag{Equ. 6.3}$$

A detector element 54 having such delimiting curve elements is illustrated in FIG. 4. In addition to the harmonics-filtering action, this example embodiment of a detector element also has the characteristics with respect to transformation properties, etc., already discussed above.

An example embodiment of a detector element as may be used in an optoelectronic detector system according to an example embodiment of the present invention is described with reference to FIG. 5. In contrast to the examples previously discussed, such a detector element 64, or a detector system having corresponding detector elements 64, may be suitable for use in a rotary position-measuring device as illustrated, for instance, in FIG. 1.

As FIG. 5 illustrates, the four quadrants K0 to K3 are formed as circle segments relative to axis of rotation A, and in each case extend over the same angle segment $\Delta\theta$. Analogous to the linear case, such a circle segment extends over angle segment $\Delta\theta=P/4$, where P indicates the angle segment over which one period P of the fringe pattern extends, the fringe pattern in this case extending in the shape of a circular ring.

Analogous to the linear case, the detector elements are mutually convertible by an angular displacement transformation. In contrast to the linear case, however, the height of the detector elements measured perpendicular to the displacement direction (thus their radial extension) is not directly determined by filter function $F(\theta)$, since it may be necessary to take into consideration a distortion by the radial geometry.

As in the previous exemplary embodiment, only the filtering of all odd-order harmonics is provided, while the even-order harmonics are eliminated differently in a conventional manner.

The necessary filter function $F(\theta)$ for the filtering of odd-order harmonics in the rotary case is:

$$F(\theta) = \begin{cases} F_0 * \cos(2\pi\theta/P) & \text{for } -P/4 < \theta < P/4 \\ 0 & \text{otherwise,} \end{cases} \quad \text{(Equ. 7)}$$

where $F_0$ represents a freely selectable constant indicating the desired extension of the detector elements in radial direction r.

The result of the filter condition in equation 7 is that corresponding detector element 64, as illustrated in FIG. 5, extends only in the two middle quadrants K1 and K2.

For simplicity, curve elements L and R illustrated in FIG. 5 are represented as Archimedean spirals (radius proportional to the angle), that is, curve elements L are described in polar coordinates (r, $\theta$) by a linear correlation between radius r and angle $\theta$. Therefore, in conjunction with the considerations discussed above, the following results for individual curve segments $C_n(\theta)$ (n=0, 1, 2):

$$C_0(\theta) = \sqrt{\left(\frac{4 \cdot \Delta r \cdot \theta}{P} + r + \frac{\Delta r}{2}\right)^2 - 2 \cdot \Delta r \cdot r \cdot \cos\left(2\pi\frac{\theta}{P}\right)} \quad \text{for } -P/4 < \theta < 0 \quad \text{(Equ. 8.1)}$$

$$C_1(\theta) = \frac{4 \cdot \Delta r \cdot \theta}{P} + r + \frac{\Delta r}{2} \quad \text{for } -P/4 < \theta < 0 \quad \text{(Equ. 8.2)}$$

$$C_1(\theta) = \sqrt{\left(\frac{4 \cdot \Delta r \cdot \theta}{P} + r - \frac{\Delta r}{2}\right)^2 + 2 \cdot \Delta r \cdot r \cdot \cos\left(2\pi\frac{\theta}{P}\right)} \quad \text{for } 0 < \theta < P/4 \quad \text{(Equ. 8.3)}$$

In equations 8.1, 8.2 and 8.3, in each case r represents the mean radius of the detector elements, $\Delta r$ indicates the radial distance of the end points of curve path O to end points U, thereby yielding:

$$C_0(0)=C_0(-P/4)=r-\Delta r/2 \quad \text{(Equ. 9.1)}$$

$$C_2(0)=C_2(+P/4)=r+\Delta r/2 \quad \text{(Equ. 9.2)}$$

Thus, suitable detector systems may be developed on the basis of the considerations described herein in the case of a rotary position-measuring device, as well.

A number of modifications and alterations shall be explained, which may all be used in conjunction with the measures discussed above.

Thus, as an alternative to the filter-function variants described above, it is also possible to use other filter functions F(x), to derive therefrom suitable contours for detector elements. For instance, it is possible to use trapezoidal filter functions F(x) if only a few harmonics are to be filtered. A trapezoidal filter function F(x) for filtering the third and fifth harmonics may be selected, for example, in the following manner:

$$F(x) = \begin{cases} 4/3 - 5*|x| & \text{for } 1/15 < |x| < 4/15 \\ 1 & \text{for } |x| < 4/15 \end{cases} \quad \text{(Equ. 10)}$$

Moreover, in principle, the selection of symmetrical filter functions F(x) may be provided, for which F(-x)=F(x) applies. In this case, the detector system for a linear fringe pattern to be scanned may be implemented in centrosymmetrical fashion with respect to a center. This measure may increase stability with respect to possible interferences of the fringe pattern.

It is possible to arrange correspondingly shaped detector elements not only immediately adjacent to one another in fringe-displacement direction v, but also to arrange them side-by-side perpendicular to v, thus in the y-direction. This is possible in particular when the limiting upper and lower curve paths O and U from the examples discussed above extend parallel to the v-axis. In this case, detector elements arranged one upon the other are in each instance electroconductively interconnected and deliver in-phase scanning signals. In this context, may be provided to form the detector elements, provided in each case one upon the other, in mirrored fashion to each other with respect to displacement direction v. Such detector systems repeating in the y-direction may be insensitive to possible interferences in the scanned fringe pattern, such as soiling on the scale, graduation errors, tilting, etc.

Furthermore, it is possible to carry out the above-described shaping of the individual detector elements not only by the direct shaping of the specific light-sensitive semiconductor material, but also, if desired, additionally by opaque (partial) resist masks on the detector surface areas. In this case, the resist masks are arranged directly on the detector elements or at least on parts thereof, and have a suitable form design of the transparent regions. Aluminum may be used for such resist masks. A variant of this type may be provided for very small fringe-pattern periods to be scanned and/or for suitable shaping in the region of the outer boundary lines.

It is possible to provide detector-element widths which deviate from P/4, thus, for example, P/3, to in this manner produce a detector system in which three scanning signals, phase-displaced by 120°, are available for further processing, etc.

In practice, the individual p-n junctions of adjacent detector elements may be insulated from one another. There are various possibilities for accomplishing this.

For example, this may be implemented by separation areas in the form of very narrow isolation trenches produced by suitable etching processes. The widths e of such separation areas or isolation trenches may be selected to be less than P/10. This may be suitable in the case of detector elements based on amorphous silicon (α-Si). Because of the small width e of such inactive areas, the filtering action described above may be virtually undisturbed. However, a detector-element system of maximum density may still be provided.

Alternatively, however, the p-n junctions between the individual detector elements may also be interrupted as is the case, for example, for separate p-doping regions on an n-substrate. This may be suitable for detector elements based on crystalline semiconductor materials. In this context, the separation areas between the detector elements have, for instance, a width e on the order of 2 to 5 μm. Within these separation areas, there is still a certain radiation sensitivity which, however, decreases continually. In this case, therefore, the center of the respective separation areas should be understood as the lastly effectively active detector boundary.

Consequently, depending on the detector technology used, there are certain minimum distances e between adjacent detector elements, these separation areas still being partially radiation-sensitive, however. To be understood by the dense detector-element system aimed for is therefore basically a system in which technologically necessitated minimum distances e are selected in the region of the contact lines of the detector elements, and no further spacing areas going over and above that may be provided, particularly not for attaining a certain filtering action. If the technologically necessitated minimum distances e become significant compared to fringe-pattern period P, the detector-geometry form of the present invention may also be used on detector widths $b=P/N-e$.

Analogous to equations 2.1 to 2.4 above, instead of the quadrants mentioned, successive intervals $I_n$ having width b may be defined, in which upper boundary lines $C_{n+1}$ and lower boundary lines $C_n$ of the detector elements are linked to each other by the relationship:

$$C_{n+1}(x)=C_n(x-b)+F(x) \quad \text{(Equ. 11)}$$

Consequently, the individual detector elements may be converted one into another through a displacement by integer multiples of P/N.

Therefore, there are a number of further design possibilities, all based on the principles discussed above.

What is claimed is:

1. An optoelectronic detector system for generating a plurality of periodic, phase-shifted scanning signals from scanning of a periodic fringe pattern that extends in a detection plane with a fringe-pattern period in a fringe-displacement direction, comprising:
a plurality of detector elements, a geometrical form of individual detector elements adapted to provide a defined filter of unwanted harmonics from the scanning signal;
wherein in one fringe-pattern period, a total number of detector elements of a same non-rectangular geometrical form and of a same geometrical orientation are arranged one immediately after another in the fringe-displacement direction to provide a densest possible arrangement of the individual detector elements, wherein the detector elements are arranged successively such that one detector element is convertible into another detector element by a displacement transformation by a multiple of the fringe-pattern period divided by the total number of detector elements arranged within one fringe-pattern period.

2. The optoelectronic detector system according to claim 1, wherein adjacent detector elements contact each other along a shared contact line.

3. The optoelectronic detector system according to claim 2, wherein the contact lines form an angle with the fringe-displacement direction unequal to 90°.

4. The optoelectronic detector system according to claim 2, wherein the detector elements have curved boundary lines in a region of longitudinal ends.

5. The optoelectronic detector system according to claim 1, wherein each detector element has a geometrical shape that deviates from a rectangle to filter at least one odd-order harmonic out of the scanning signals.

6. The optoelectronic detector system according to claim 1, wherein each detector element has a same width along a line of intersection parallel to the fringe-displacement direction.

7. The optoelectronic detector system according to claim 6,
wherein the width of each detector element along the line of intersection satisfies the following relationship:

$$b=P/N-e;$$

wherein b represents the width of one detector element along the line of intersection;
wherein P represents the fringe-pattern period;
wherein N represents the number of detector elements per fringe-pattern period; and
e represents a technology-dependent minimum distance of active detector-element areas.

8. The optoelectronic detector system according to claim 1, wherein the total number of detector elements within one fringe-pattern period is one of (a) four and (b) three.

9. The optoelectronic detector system according to claim 1, wherein the detector elements are configured to generate in-phase scanning signals from scanning of the fringe pattern and are electroconductively interconnected.

10. The optoelectronic detector system according to claim 1, wherein all of the detector elements have the same geometrical form.

11. An optoelectronic detector system for generating a plurality of periodic, phase-shifted scanning signals from scanning of a periodic fringe pattern that extends in a detection plane with a fringe-pattern period in a fringe-displacement direction, comprising:
a plurality of detector systems adjacently arranged in parallel, perpendicular to the fringe-displacement direction, each detector system including a plurality of detector elements, a geometrical form of individual detector elements adapted to provide a defined filter of unwanted harmonics from the scanning signal;
wherein in one fringe-pattern period, a total number of detector elements in each detector system of a same non-rectangular geometrical form and of a same geometrical orientation are arranged one immediately after another in the fringe-displacement direction to provide a densest possible arrangement of the individual detector elements, wherein the detector elements are arranged successively such that one detector element is convertible into another detector element by a displacement transformation by a multiple of the fringe-pattern period divided by the total number of detector elements arranged within one fringe-pattern period.

12. The optoelectronic detector system according to claim 11, wherein all of the detector elements have the same geometrical form.

13. A position-measuring device for determining a position of two objects movable relative to each other, comprising:
- a measuring graduation extending in a measuring direction;
- a scanning unit movable relative to the measuring graduation, the scanning unit including:
- a light source; and
- an optoelectronic detector system configured to generate a plurality of periodic, phase-shifted scanning signals from scanning of a periodic fringe pattern that extends in a detection plane with a fringe-pattern period in a fringe-displacement direction, the optoelectronic detector system including a plurality of detector elements, a geometrical form of individual detector elements adapted to provide a defined filter of unwanted harmonics from the scanning signal, in one fringe-pattern period, a total number of detector elements of a same non-rectangular geometrical form and of a same geometrical orientation arranged one immediately after another in the fringe-displacement direction to provide a densest possible arrangement of the individual detector elements, wherein the detector elements are arranged successively such that one detector element is convertible into another detector element by a displacement transformation by a multiple of the fringe-pattern period divided by the total number of detector elements arranged within one fringe-pattern period.

14. The position-measuring device according to claim 13, wherein the measuring direction extends along a straight line.

15. The position-measuring device according to claim 13, wherein the measuring direction extends along a circular path.

16. The position-measuring device according to claim 13, wherein all of the detector elements have the same geometrical form.

* * * * *